(12) United States Patent
Wohlgenannt et al.

(10) Patent No.: US 12,008,783 B2
(45) Date of Patent: Jun. 11, 2024

(54) REALITY CAPTURE DEVICE

(71) Applicant: LEICA GEOSYSTEMS AG, Heerbrugg (CH)

(72) Inventors: Rainer Wohlgenannt, Klaus (AT); Lukas Heinzle, Wädenswil (CH); Garance Bruneau, Zürich (CH); Ralph Harti, Goldach (CH); Roland Graf, Untereggen (CH); Roman Steffen, Rebstein (CH); Simon Mark, Thal (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 55 days.

(21) Appl. No.: 17/827,527

(22) Filed: May 27, 2022

(65) Prior Publication Data
US 2022/0414915 A1    Dec. 29, 2022

(30) Foreign Application Priority Data
May 27, 2021   (EP) .................................... 21176387

(51) Int. Cl.
*G06T 7/70*      (2017.01)
*G01S 7/481*     (2006.01)
(Continued)

(52) U.S. Cl.
CPC .............. *G06T 7/70* (2017.01); *G01S 7/4817* (2013.01); *G01S 7/4865* (2013.01);
(Continued)

(58) Field of Classification Search
None
See application file for complete search history.

(56) References Cited

U.S. PATENT DOCUMENTS

| | | | |
|---|---|---|---|
| 2015/0341555 A1* | 11/2015 | Artonne | G03B 17/02 |
| | | | 348/36 |
| 2018/0302611 A1 | 10/2018 | Baak et al. | |

(Continued)

FOREIGN PATENT DOCUMENTS

| | | |
|---|---|---|
| WO | 2018140656 A1 | 8/2018 |
| WO | 2020126123 A1 | 6/2020 |

OTHER PUBLICATIONS

Bartczak, et al., "Integration of a Time-of-Flight Camera into a Mixed Reality System for Handling Dynamic Scenes, Moving Viewpoints and Occlusions in Real-Time" Proceedings of 3DPVT'08—the Fourth International Symposium on 30 Data Processing, Visualization and Transmission, Jun. 18, 2008, pp. 1-8.

(Continued)

*Primary Examiner* — Eileen M Adams
(74) *Attorney, Agent, or Firm* — Maschoff Brennan

(57) ABSTRACT

A reality capture device configured to perform a measuring process for generating a digital representation of an environment comprising a body defining a first axis, and an imaging unit with one or more 2D cameras configured to provide 2D image data of the environment. The device comprises a ToF camera arrangement configured for capturing 3D point-cloud data of the environment and comprising at least two time-of-flight cameras, wherein each time-of-flight camera comprises a sensor array and one or more laser emitters, the sensor array of each of the time-of-flight cameras having an optical axis and being configured to receive reflections of light pulses emitted by the one or more laser emitters of the respective time-of-flight camera, the time-of-flight cameras being arranged around the first axis so that each sensor array has one or two other sensor arrays as a neighbouring sensor array.

19 Claims, 6 Drawing Sheets

(51) Int. Cl.
| | |
|---|---|
| *G01S 7/4865* | (2020.01) |
| *G01S 17/894* | (2020.01) |
| *G02B 13/06* | (2006.01) |
| *G03B 17/56* | (2021.01) |
| *H04N 23/51* | (2023.01) |
| *H04N 23/698* | (2023.01) |
| *H04N 23/90* | (2023.01) |
| *H04N 7/015* | (2006.01) |

(52) U.S. Cl.
CPC ............ *G01S 17/894* (2020.01); *G02B 13/06* (2013.01); *G03B 17/563* (2013.01); *H04N 23/51* (2023.01); *H04N 23/698* (2023.01); *H04N 23/90* (2023.01); *G06T 2207/10028* (2013.01); *G06T 2207/10048* (2013.01); *G06T 2207/30241* (2013.01); *G06T 2207/30244* (2013.01); *H04N 7/015* (2013.01)

(56) References Cited

U.S. PATENT DOCUMENTS

2022/0291386 A1\* 9/2022 Canoglu ................. G01S 7/484
2023/0276053 A1\* 8/2023 Gudumasu ....... H04N 21/26258
    375/240.02

OTHER PUBLICATIONS

European Search Report from corresponding EP Application No. 21176387.5, dated Nov. 4, 2021.

\* cited by examiner

REALITY CAPTURE DEVICE

BACKGROUND

The present invention relates to a reality capture device for generating a digital three-dimensional representation of an environment, particularly for surveying within a building.

Surveying of a building and surrounding terrain is of interest, e.g., for architects or craftsmen in order to quickly assess an actual condition of a room or a construction progress of a construction site, respectively, e.g. to efficiently plan the next work steps. By means of a digital visualization of the actual state, e.g. in the form of a point cloud or a vector file model, or by means of an augmented reality functionality, different options for further steps or expansion options can be examined and optionally presented to an employee or a customer in an easily accessible way.

Also, three-dimensional (3D) surveillance systems are used to monitor neuralgic points within a city, such as railway stations, airports, city parks, or otherwise busy public places, or to safeguard restricted or dangerous areas, e.g. industrial plants, construction sites, or business complexes. Furthermore, operation of a facility may be supported, e.g. supervision of a warehouse or a car park.

WO 2020/126123 A2 discloses a compact reality capture device comprising a laser scanner and at least one camera. With this device, an environment can be optically scanned and measured by means of the laser scanner emitting a laser measurement beam, e.g. using pulsed electromagnetic radiation, wherein an echo is received from a backscattering surface point of the environment and a distance to the surface point is derived and associated with an angular emission direction of the associated laser measurement beam. This way, a three-dimensional point cloud is generated. For example, the distance measurement may be based on the time of flight, the shape, and/or the phase of the pulse. For additional information, the laser scanner data is combined with camera data, in particular to provide high-resolution spectral information, e.g. by means of an RGB camera or an infrared camera. The reality capture device may be a fixedly installed monitoring system. Alternatively, the reality capture device may be mobile and configured to provide surveying data and referencing data at the same time, e.g. wherein at least trajectory data of the device, e.g. position and/or pose data, are provided with the probing data, e.g. laser scanner data and/or camera data, such that probing data of different positions of the reality capture device can be combined into a common coordinate system. The reality capture devices can be configured to autonomously create a 3D map of a new environment, e.g. by means of a simultaneous localization and mapping (SLAM) functionality.

Especially for mobile applications, it would be desirable to have a reality capture device that is lighter and easier to use than existing devices.

It is known that time-of-flight (ToF) cameras can be used—especially for indoor applications with short-range measurements—to produce meshes that may be used for similar applications like point-clouds generated by laser scanners. A main advantage of ToF-sensor-chip based systems is the capability of acquiring multiple 3D points simultaneously in a very short time, compared to traditional scanning systems. This means that these systems have a relatively high data acquisition rate even with a low resolution (compared to traditional image sensors which have a very high resolution). Additionally the acquired 3D points in space are homogeneously arranged e.g. in a rectangular form, as opposed to traditional scanning systems, which deliver "scan-traces" which are not as suitable for post processing or deploying SLAM algorithms.

Compact ToF cameras have been developed for use in mobile phones and tablet computers. These applications however mostly focus on augmented or extended reality applications and improved pose estimations for the built-in cameras. Due to the limited field of view, spatial mapping using a mobile phone or tablet computer having a ToF camera is cumbersome, error-prone and time-consuming.

SUMMARY

It is therefore an object of the present disclosure to provide an improved reality capture device.

It is a particular object to provide an improved reality capture device that has a less complex setup, particularly fewer or no moving parts, so that it is easier to build, needs less maintenance and is generally more durable.

It is another object to provide an improved reality capture device that allows an easier and/or faster capture of various kinds of environments.

It is a further object to provide an improved reality capture device that allows instantly capturing image data and 3D point information in 360°, particularly with a field of view that is at least hemispherically.

At least one of these objects is achieved by the characterizing features of the independent claims. Features which further develop the disclosure in an alternative or advantageous manner can be found in the dependent claims.

A first aspect relates to a reality capture device configured to perform a measuring process for generating a digital representation of an environment, e.g. a three-dimensional (3D) point cloud or mesh. The device comprises a body defining a first axis and an imaging unit having one or more cameras (2D cameras) and being configured to provide two-dimensional (2D) image data of the environment.

The device further comprises a time-of-flight (ToF) camera arrangement configured for capturing 3D point-cloud data of the environment and comprising at least two ToF cameras that are arranged around the first axis. Each ToF camera comprises a sensor array and one or more laser emitters. The sensor array of each of the ToF cameras has an optical axis and is configured to receive reflections of light pulses emitted by the one or more laser emitters of the respective ToF camera.

The ToF cameras (or more precisely: their sensor arrays) are arranged around the first axis so that each of them has one (in the case of exactly two ToF cameras) or two (in the case of more than two ToF cameras) other ToF cameras as neighbouring ToF cameras (or neighbouring sensor arrays), wherein no angle (about the first axis) between the optical axes of a sensor array and one of its neighbouring sensor arrays is larger than $$\frac{360°}{n} + 20°,$$

where n is the number of time-of-flight cameras arranged around the first axis.

For instance, in the case of exactly two ToF cameras that are evenly distributed around the first axis, each angle between neighbouring optical axes is 180° (2×180°=360°). However, for some applications, it may be sufficient to capture 3D data in a visual field of 340°. Thus, the cameras may be distributed unevenly, as long as no angle between neighbouring optical axes exceeds 200°.

According to one embodiment of the reality capture device, the ToF camera arrangement comprises at least three time-of-flight cameras that are around the first axis (8) so that each sensor array (33) has two other sensor arrays (33) as neighbouring sensor arrays, wherein no angle about the first axis (8) between the optical axes (83) of a sensor array (33) and one of its neighbouring sensor arrays is larger than 140°.

For instance, in the case of exactly three ToF cameras that are evenly distributed around the first axis, each angle between neighbouring optical axes is 120° (3×120°=360°). However, since it may be sufficient to capture 3D data in a visual field of 340°, the cameras may be distributed unevenly, as long as no angle between neighbouring optical axes exceeds 140°.

According to another embodiment of the reality capture device, each of the ToF cameras has a rectangular sensor array with a longitudinal axis that is parallel to two sides of the sensor array and orthogonal to the respective optical axis. For instance, each rectangular sensor array may have an aspect ratio of 4:3. Each rectangular sensor array may be arranged so that its longitudinal axis is tilted relative to a second axis that is orthogonal to the first axis so that an angle between the longitudinal axis and said second axis is between 10° to 45°, for instance 35° or about 35°. Advantageously, this allows reducing or avoiding gaps in the covered field of view, especially if a domed, e.g. hemispherical, field of view is captured.

According to another embodiment of the reality capture device, the sensor arrays are arranged tilted relative to the first axis, so that an angle between the first axis and the optical axis of each ToF camera is between 45° and 65°, particularly about 55°. The ToF cameras pointing upwards like this, capturing a hemispherical or domed field of view is facilitated.

In some embodiments, each sensor array has a resolution of at least 0.3 Megapixels, for instance a resolution of at least 640×480 pixels.

In some embodiments, the sensor arrays are arranged and configured for jointly covering at least 75% of a hemispherical field of view, particularly at least 90%.

In some embodiments, the laser emitters comprise laser diodes provided on a printed circuit board of the respective time-of-flight camera, and/or are configured to emit infrared light.

According to some embodiments of the reality capture device, two or more 2D cameras of the imaging unit, particularly at least three 2D cameras, are arranged around the first axis.

In one embodiment, the two or more 2D cameras are arranged and configured for jointly covering at least a visual field of view covered by the sensor arrays, or at least 90% of a visual field of view covered by the sensor arrays.

In one embodiment, the two or more 2D cameras are arranged and configured for jointly covering at least 75%, particularly at least 90%, of a hemispherical visual field—or at least 90% of at least 340° (about the first axis) of a hemispherical visual field.

In some embodiments, the imaging unit comprises one or more ultra-high-definition (UHD) cameras, e.g. configured to provide images with at least 20 Megapixels.

According to another embodiment of the reality capture device, the imaging unit comprises a fisheye-camera arrangement with a high-resolution 2D camera and a fisheye lens, the camera and the fisheye lens of the fisheye-camera arrangement being arranged and configured to capture image data covering a visual field of 360° around the first axis and at least 160° around a second axis that is orthogonal to the first axis.

In one embodiment, the high-resolution 2D camera and the fisheye lens of the fisheye-camera arrangement are arranged and configured to capture image data covering a visual field of 360° around the first axis and at least 190° around the second axis.

In another embodiment, the high-resolution 2D camera has a first optical axis that is parallel to the first axis or coincides with the first axis.

In another embodiment, the high-resolution 2D camera is a UHD camera, e.g. configured to provide images with at least 20 Megapixels.

According to some embodiments of the reality capture device, the time-of-flight cameras and the at least one 2D camera are integrated into the body of the device, wherein the body has a housing with a lateral surface defining the first axis. For instance, the lateral surface may be arranged circumferentially around the first axis.

In one embodiment, the housing comprises an area that is permeable for infrared radiation, and the laser emitters are integrated into the housing and configured to emit infrared laser beams through the permeable area, particularly also the sensor arrays of the ToF cameras are integrated into the housing at the permeable area.

According to some embodiments, the reality capture device is a mobile reality capture device configured to be carried and moved by a mobile carrier, for instance a person, a robot, a vehicle or an aircraft (e.g. a UAV), and to be moved during the measuring process. The mobile reality capture device comprises a localization unit configured for continuously determining a pose of the mobile reality capture device and for generating localization data.

In some embodiments, said localization unit comprises an inertial measurement unit (IMU) and/or is configured for determining a trajectory of the mobile reality capture device.

In some embodiments, the mobile reality capture device is designed to be oriented during the measuring process so that the first axis is upright.

In some embodiments, the mobile reality capture device comprises a handle portion and is configured to be carried by a person.

According to one embodiment, the mobile reality capture device is configured for executing the measuring process while it is moved along a path through the environment. In the course of this measuring process 3D point-cloud data of the environment is captured continuously with the ToF cameras,
   2D image data of the environment is captured continuously by the one or more 2D cameras,
   the localization unit is configured to continuously generate localization data while the device is moved along the path and to track a pose of the device based on the localization data, particularly in six degrees of freedom (6 DOF), and
   the device is configured to link the captured point-cloud data and image data to the pose at which they are captured.

In one embodiment, the ToF cameras and the one or more 2D cameras each are configured to capture and provide the 3D point-cloud data and the 2D image data, respectively, with a rate of at least 5 operations per second, particularly at least 25 operations per second.

According to one embodiment of the mobile reality capture device, the localization unit is configured to execute a ToF-SLAM functionality using the 3D point-cloud data for simultaneous localization and mapping, particularly also using 2D image data of the imaging unit and/or localization data of the localization unit.

According to another embodiment of the mobile reality capture device, the localization unit is configured to execute a pose and trajectory determination functionality for continuously determining a pose and a trajectory of the device based on 2D image data of the imaging unit and/or on 3D point-cloud data, particularly further based on localization data of the localization unit.

According to another embodiment of the mobile reality capture device, at least a subset of the laser emitters is configured to emit light pulses in the form of a pattern to generate a pattern of reflections of the light pulses, and the ToF camera arrangement is configured for capturing 3D point-cloud data using the pattern of reflections. For instance, the subset of the laser emitters may comprise an optical lens, grating and/or mesh to produce the pattern. In one embodiment, the localization unit is configured to use the 3D point-cloud data of the pattern of reflections to perform a ToF-SLAM functionality for simultaneous localization and mapping.

According to another embodiment of the mobile reality capture device, the laser emitters are configured emit diffused infrared lighting, and the sensor array of each of the time-of-flight cameras is configured to receive reflections of the diffused infrared lighting emitted by the one or more laser emitters of the respective time-of-flight camera. The time-of-flight cameras are configured to generate intensity images based on the received reflections of the diffused infrared lighting, and the localization unit is configured to execute a Visual SLAM (V-SLAM) and/or ToF-SLAM functionality using the intensity images received from the time-of-flight cameras for simultaneous localization and mapping, particularly also using two-dimensional image data of the imaging unit and/or localization data of the localization unit.

In some embodiments, the mobile reality capture device is designed to be oriented during the measuring process so that the first axis is upright.

According to some embodiments, the mobile reality capture device comprises a handle portion, the device and the handle portion being designed so that the device can be held by a user during the measuring process.

In one embodiment, the device and the handle portion are designed so that the first axis of the device is held tilted away from the user, particularly with an angle from the vertical of less than 20°, for instance between 10° and 20°.

In another embodiment, the time-of-flight cameras are arranged around the first axis so that no light pulses are emitted by the one or more laser emitters into a direction of the user holding the device, the direction being defined by the position of the handle portion relative to the first axis.

According to another embodiment, the reality capture device comprises a processor configured for processing or pre-processing point-cloud data and/or image data, and/or a communication unit configured for uploading and/or streaming point-cloud data and/or image data, to a computer or into a public or enterprise cloud. For instance, the communication unit may be a wireless communication unit configured for uploading and/or streaming the point-cloud data and/or image data via WLAN, Bluetooth or mobile radio.

In one embodiment, the processor is configured for pre-processing point-cloud data and/or image data, and the wireless communication unit is configured for uploading and/or streaming the pre-processed point-cloud data and/or image data to allow post-processing of the pre-processed data at the computer or cloud.

A second aspect pertains to a method for spatial mapping of an environment using a mobile reality capture device, particularly the mobile reality capture device according to the first aspect. The method comprises continuously capturing 3D point-cloud data and 2D image data of the environment while moving along a path through the environment, wherein the 2D image data is captured by one or more 2D cameras that are arranged on the device and configured for jointly covering at least 75% of a hemispherical field of view;

the 3D point-cloud data of the environment is captured simultaneously with a plurality of ToF cameras, each ToF camera comprising a sensor array and one or more laser emitters, the sensor arrays receiving reflections of light pulses emitted by the one or more laser emitters of the respective ToF camera, the sensor arrays being arranged on the device and configured for jointly covering at least 75% of a hemispherical field of view; and localization data is generated continuously while moving along the path, a position is tracked based on the localization data, and the captured point-cloud data and image data are linked to the position at which they are captured.

BRIEF DESCRIPTION OF THE DRAWINGS

The aspects are described or explained in more detail below, purely by way of example, with reference to working examples shown schematically in the drawing. Identical elements are labelled with the same reference numerals in the figures. The described embodiments are generally not shown true to scale and they are also not to be interpreted as limiting.

DETAILED DESCRIPTION

Figure 1:
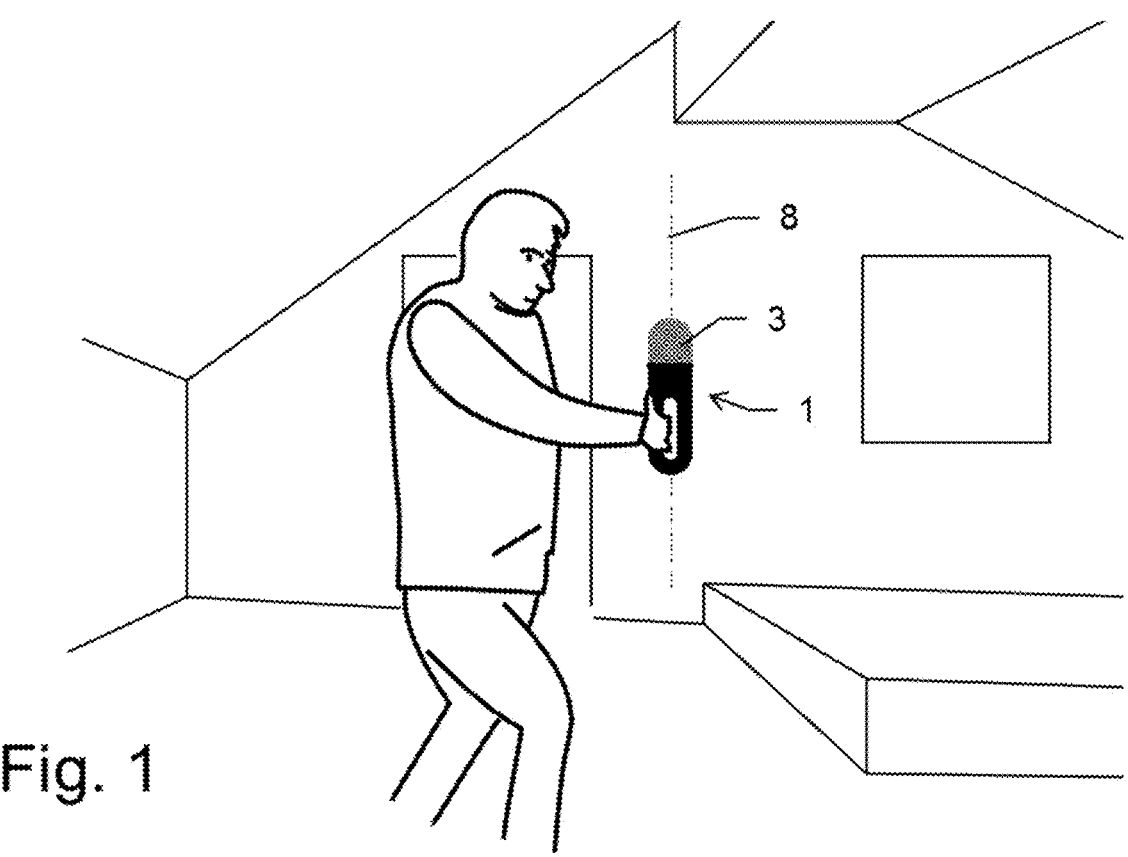
FIG. 1 shows an exemplary application of a mobile reality capture device in building surveying.

FIG. 1 shows an exemplary application of a mobile reality capture device 1 in the field of architecture or real estate, e.g. wherein an architect or a potential home buyer would like to have a 3D model of a room or the entire building for providing improved visualization of details or potential extension plans.

The mobile reality capture device 1 comprises a localization unit, e.g. for the purposes of providing a simultaneous localization and mapping (SLAM) functionality, and is configured to be carried by a user through the room. A sensor unit 3 of the reality capture device 1 comprises a time-of-flight (ToF) camera unit comprising a plurality of ToF cameras, and an imaging unit comprising at least one "regular", i.e. two-dimensional (2D), high-resolution (HR) camera.

ToF cameras are range-imaging camera systems generally known in the art and employ time-of-flight techniques to resolve distance between the camera and the subject for each point of the image, by measuring the round trip time or the phase shift of an artificial light signal, e.g. provided by a laser or an LED. Laser-based ToF cameras are part of a broader class of "scannerless" LIDAR (i.e. LIDAR without mechanically moving scanning elements, also referred to as "solid state LIDAR"), in which the entire scene (or large parts thereof) is captured with each laser pulse, as opposed to point-by-point with a laser beam such as in scanning LIDAR systems. The spatial resolution of ToF cameras is generally low compared to standard 2D cameras. Compared to other 3D laser scanning methods for capturing 3D images, ToF cameras operate more quickly and provide better point grids.

In general, ToF cameras measure a time delay between the emission of a light signal and the detection of the back-reflected signal. Sometimes, these cameras are also referred to as Range-Imaging Cameras or RIM cameras. Different kinds of ToF cameras exist that may be used. Some embodiments of the reality capture device may comprise ToF cameras that use Direct-Time-of-Flight (dToF), i.e. direct measurement of the time delay between two adjacent pulses. These are also referred to as Pulsed-Time-of-Flight (pToF). Other embodiments may comprise ToF cameras that use Indirect-Time-of-Flight (iToF), i.e. using a periodic waveform and phase delay to obtain the time delay. These are also referred to as Continuous-Wave Time-of-Flight (cwToF).

The room is surveyed during the movement of the mobile reality capture device 1, wherein the data from the ToF cameras and the imaging unit captured at different locations is referenced to each other by means of the localization unit, e.g. within the scope of a SLAM (simultaneous localization and mapping) functionality. Because of the movement of the user, objects and spatial area can be measured from different angles, as a result of which, shadowing and/or dead angles can be avoided.

Each ToF camera has one or more laser emitters, arranged and configured to emit light pulses towards surfaces in the surrounding that lie in a field of view of a sensor array of the same ToF camera. For the purpose of performing SLAM, the light pulses may be emitted discretely and need not be distributed to cover the entire field of view.

A lateral surface of the mobile reality capture device 1 defines a first axis 8 of the mobile reality capture device, wherein in the shown exemplary embodiment the lateral surface is circumferentially arranged around the standing axis. The device is designed to be held during a measuring process so that the first axis 8 is upright, i.e. a vertical axis. The cameras of both the ToF camera unit and the imaging unit are positioned and configured to each cover a visual field of more than 180° around the first axis 8, particularly a full 360° panorama.

Depending on the number and distribution of the cameras, especially the visual field of the sensors of the ToF camera unit may have some gaps. These gaps should not amount to more of 25% of a full-dome field of view, preferably less than 10%.

In some embodiments, since the user's head may obstruct the field of view, the visual field of view of the ToF camera unit may be restricted to leaving out that part that is normally obstructed by the user, so that only about 340° or 350° of the full panorama are covered. This allows using fewer ToF cameras and/or reduction of gaps in the unobstructed part of the field of view.

Alternatively, to prevent obstruction of the field of view by the user's head, the device can be held so that the first axis 8 is tilted towards the direction of movement, i.e. away from the user, e.g. by up to 20°. A handle of the device can optionally be designed to allow both the tilted and the upright orientation of the device.

The 2D cameras of the imaging unit may comprise one or more cameras configured for use in a visual SLAM (V-SLAM) functionality, one or more colour cameras, e.g. for colouring the digital representation of the environment (3D point cloud or mesh), one or more high resolution cameras, e.g. for providing a high-resolution detail image, one or more high dynamic range (HDR) cameras, e.g. single exposure HDR cameras, one or more multi spectral, particularly hyperspectral, cameras, e.g. for identification of surface properties or for differentiating different kinds of surfaces, and one or more thermal cameras, e.g. for providing temperature information. In particular, one or more cameras may comprise more than one or all of the above features.

The mobile reality capture device 1 may further include other sensors or have additional auxiliary device interfaces, e.g. an interface for attaching a GNSS receiver or a display. In particular, the mobile reality capture device 1 is configured to communicate with an external processing unit of a companion device, e.g. a computer, tablet or smartphone, which is configured to process at least parts of the measurement data of the reality capture device 1, e.g. for referencing the regular camera data with the ToF camera data or for providing extended display functionality.

In particular, the reality capture device 1 is configured to transmit measurement data to the external processing unit by means of a data streaming started simultaneously or at least close in time relative to the measurement process, e.g. via WLAN or Bluetooth connection, so that the processing of the measurement data on the external processing unit can take place essentially parallel to the data acquisition. For example, this way the measurement data can be displayed continuously for a user as a continuously growing coloured 3D point cloud or mesh, e.g. by means of a display coupled to the mobile reality capture device 1.

The localization unit may be configured to determine a trajectory of the mobile reality capture device 1 with six degrees of freedom (6 DOF), i.e. involving position and orientation (pose) of the mobile reality capture device. In particular, the mobile reality capture device 1 may be configured for simultaneous localization and mapping (SLAM) to generate a three-dimensional map by involving at least one of data of an inertial measurement unit (IMU-SLAM), image data of the camera unit for visual SLAM (V-SLAM), and—similar to LIDAR-SLAM—using data of the ToF cameras for ToF-based SLAM mapping (ToF-SLAM). This approach is described generically in the paper "SLAM combining ToF and High-Resolution cameras" by V. Castañeda, D. Mateus and N. Navab (Computer Aided Medical Procedures (CAMP), Technische Universitat München) which is hereby incorporated by reference in its entirety.

In addition to the localization unit, the reality capture device 1 may be additionally provided with a positioning unit such as a global navigation satellite system (GNSS) transceiver or a compass, e.g. for referencing the data of the mobile reality capture device with a global coordinate system.

Using the device 1, the operator may perform a method for spatial mapping of the environment, wherein the method comprises continuously capturing 3D point-cloud data and 2D image data of the environment while moving through the environment. According to some embodiments, the 3D data of the environment is captured with a plurality of ToF cameras that are arranged and configured for jointly covering at least a hemispherical field of view, the image data is captured by one or more digital cameras that are arranged and configured for jointly covering at least a hemispherical field of view, and localization data is generated continuously while moving along a path through the environment, a position is tracked based on the localization data, and the captured point-cloud data and image data are linked to the position at which they are captured. The three TOF cameras may capture the data either simultaneously, sequentially or interleaved. The position may also comprise an orientation, particularly in 6 DOF.

Alternatively, the mobile reality capture device may be configured to be carried and moved by a robot, a vehicle or an aircraft, e.g. an unmanned aerial vehicle (UAV).

Figures 2A, 2B:
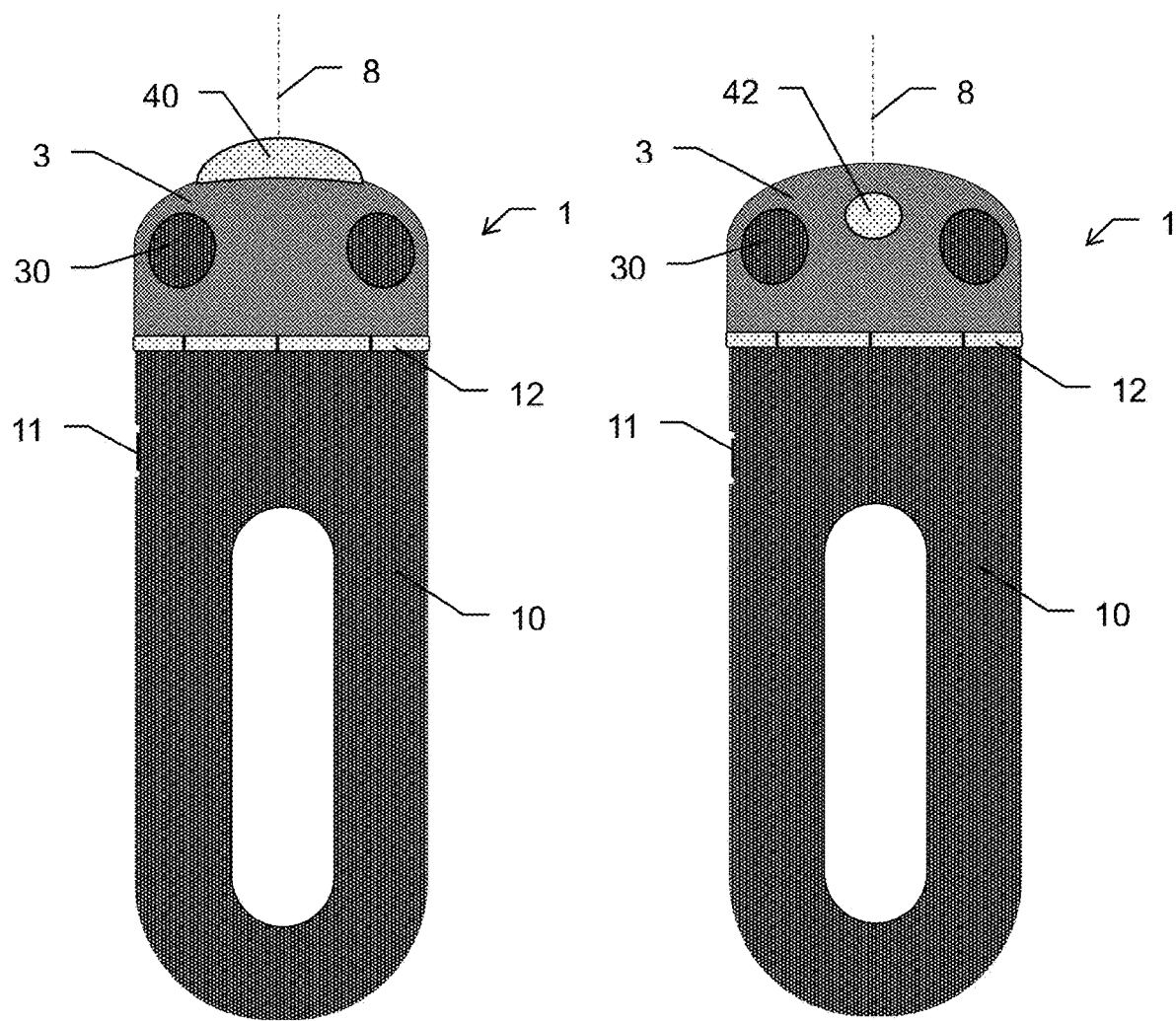
FIGS. 2a,b show two exemplary embodiments of a mobile reality capture device.

FIGS. 2a and 2b each show an exemplary embodiment of a mobile reality capture device 1, each device comprising a handle portion 10 and a sensor unit 3. Each sensor unit 3 comprises a ToF camera unit with three ToF cameras 30 and a imaging unit with one or more RGB cameras 40, 42. Of course, a different number of ToF cameras 30 can be chosen, depending on the shape of the device and the necessary or desired field of view.

The mobile reality capture device optionally may be configured to require only a minimum number of controls integrated into the device. In the shown example, the device only has a single integrated control element 11, which has an activated and an inactive state and is switchable via an external action to assume the activated or the inactive state.

Individual measurement programs and/or actions of the reality capture device can be triggered by at least one of: a change of the state of the control element 11 from the inactive to the active state, a change of the state of the control element 11 from the active to the inactive state, a switching of the control element 11 by means of a lasting external effect during a defined period of time (e.g. continuous pressing of a control button), an encoded sequence of state changes of the control element 11 between the active and inactive state, and a coded sequence of temporally lasting external effects on the control element 11 over defined periods of time. Such measurement programs or actions may include at least one of starting a defined measuring process, or interrupting, cancelling or restarting the measuring process.

The mobile reality capture device 1 can also be configured such that defined measurement programs and actions are stored on the device and/or that new measurement programs and actions can be defined by the user, e.g. via a corresponding input functionality for assigning commands to the states and/or state changes of the control element 11.

The mobile reality capture device 1 may further comprise a light indicator 12, e.g. for indicating a device status in such a way that the status indication looks uniform in all azimuthal directions around the standing axis of the reality capture device. Furthermore, the light indicator 12 may be configured to provide guiding instructions for the operator.

The sensor unit 3 of the mobile reality capture device 1 of FIG. 2a comprises a ToF camera unit with three ToF cameras 30 (only two of these are visible in this view) and a single fisheye camera setup comprising a "fisheye lens" 40 i.e. an ultra-wide-angle lens that produces strong visual distortion to create a hemispherical or almost hemispherical image. Said fisheye camera setup allows capturing image data in 360° around the vertical first axis 8 of the device. The optical axis of the fisheye camera may coincide with or be parallel to the first axis 8.

The sensor unit 3 of the mobile reality capture device 1 of FIG. 2b comprises the same ToF camera unit as that of FIG. 2a. Instead of a fisheye camera, the imaging unit in this embodiment comprises three cameras 42 (only one being visible in this view) that arranged between the three ToF cameras 30. The three cameras 42 are arranged so that they capture image data in 360° around the vertical first axis 8.

Although the three RGB cameras 42 and the three ToF cameras 30 are depicted as being positioned at the same level, of course also other configurations are possible, where the cameras are positioned at different levels. Also, the number of RGB cameras 42 and ToF cameras 30 may be higher or lower than three, wherein two or more ToF cameras 30 are needed.

Figure 3A:
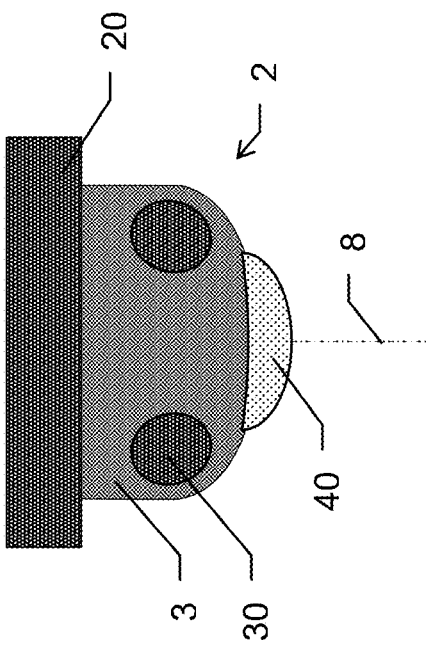
FIGS. 3a,b show two exemplary embodiments of a stationary reality capture device.
Figure 3B:
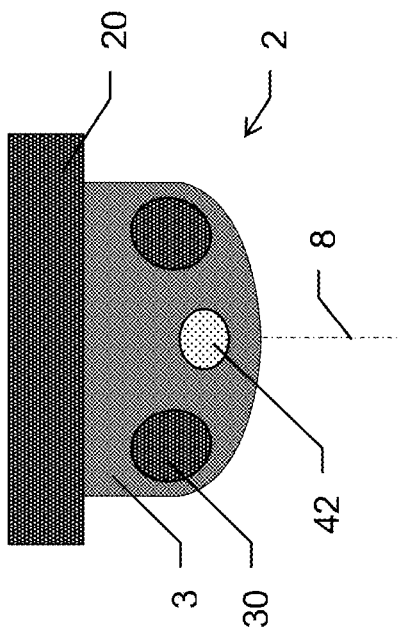

FIGS. 3a and 3b each show an exemplary embodiment of a fixedly mounted reality capture device 2, each sensor unit 3 comprising a ToF camera unit with three ToF cameras 30 and a imaging unit with one or more cameras 40, 42. The devices 2 are attached to a base 20 which can be fixedly mounted on mobile or immobile object, e.g. a vehicle or a roof or wall. The base can be mounted so that the first axis 8 is vertical or horizontal or at any angle in between.

The sensor unit 3 of the mounted reality capture device 2 of FIG. 3a comprises a ToF camera unit with three ToF cameras 30 (only two of these are visible in this view) and a single fisheye camera comprising a fisheye lens 40 for capturing image data in 360° around the first axis 8 of the device. The optical axis of the fisheye camera may coincide with or be parallel to the first axis 8.

The sensor unit 3 of the mounted reality capture device 2 of FIG. 3b comprises the same ToF camera unit as that of FIG. 2a. Instead of a fisheye camera, the imaging unit in this embodiment comprises three cameras 42 (only one being visible in this view) that arranged between the three ToF cameras 30. The three cameras are arranged so that they capture image data in 360° around the first axis 8.

Figure 4A:
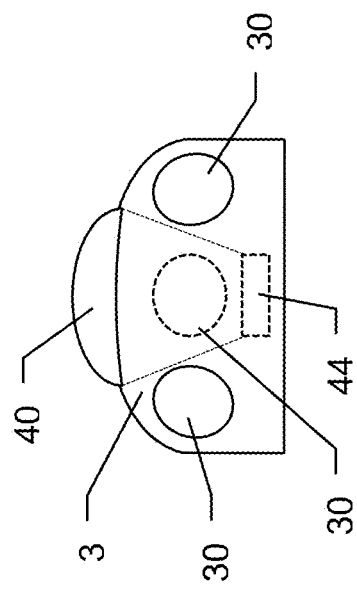
FIGS. 4a,b show the sensor units of two exemplary embodiments of a reality capture device.
Figure 4B:
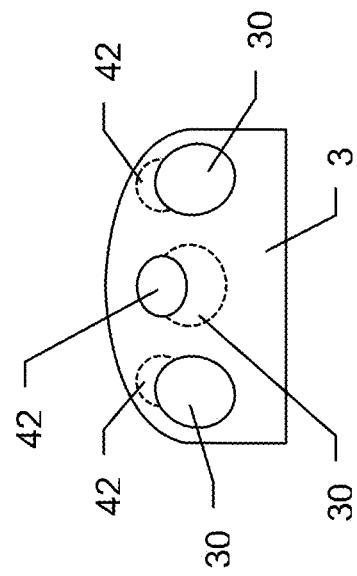

FIGS. 4a and 4b each show a sensor unit 3 of the reality capture devices of FIGS. 2a,b and 3a,b. The cameras on the backside and in the interior are made visible here using dashed lines. In both embodiments, the sensor unit 3 comprises three ToF cameras 30 that are arranged at the same distances around the housing of the sensor unit 3 to cover a hemispherical field of view.

In the interior of the sensor unit 3 of FIG. 4a, a high-definition 2D camera 44 is oriented towards the fisheye lens 40 to capture images with high resolution in a hemispherical field of view. On the outer surface of the sensor unit 3 of FIG. 4b, three high-definition 2D cameras 42 are positioned between the ToF cameras 30 to cover a hemispherical field of view.

Figure 5A:
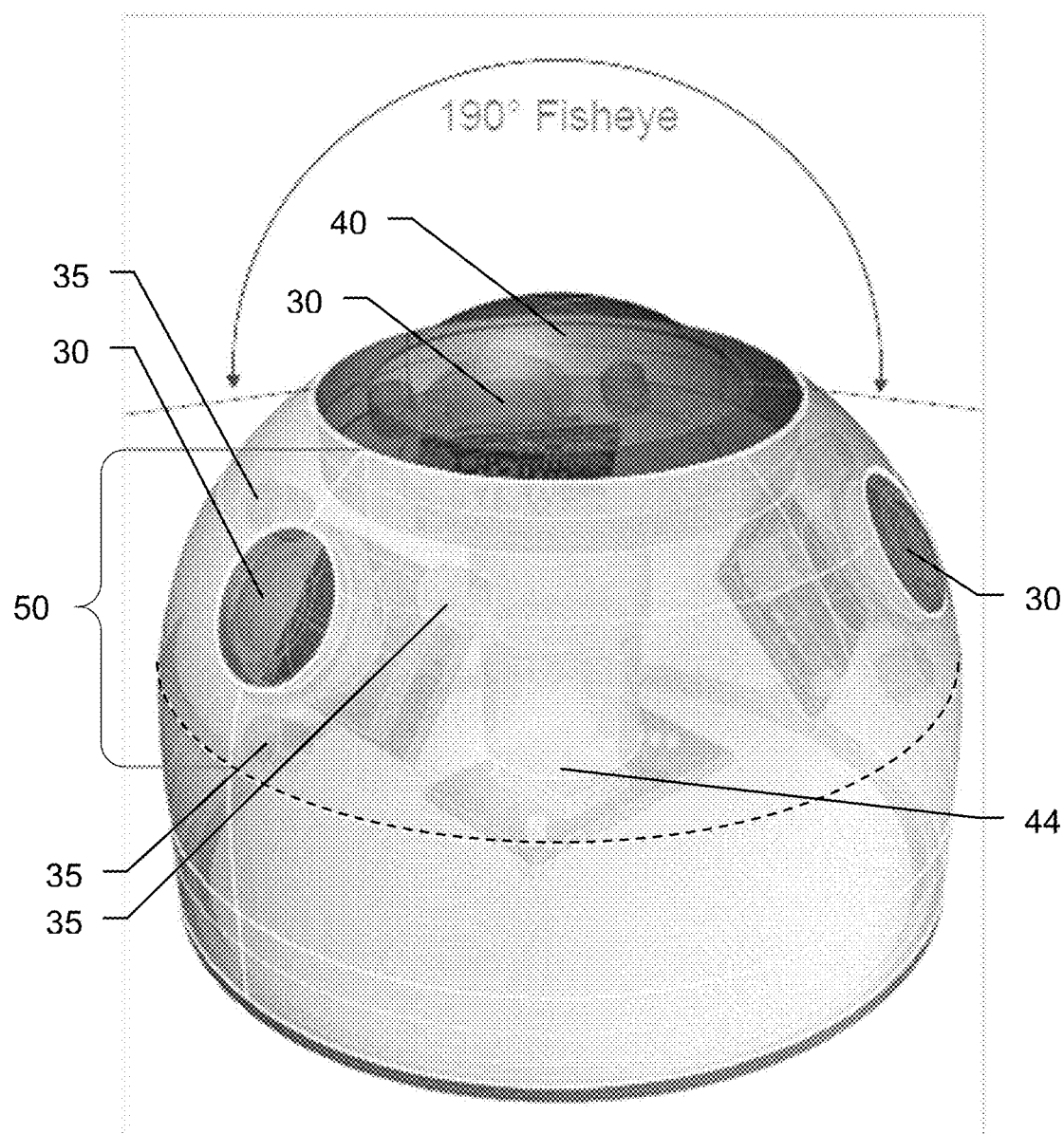
FIGS. 5a,b illustrate details of an exemplary sensor unit a reality capture device.
Figure 5B:
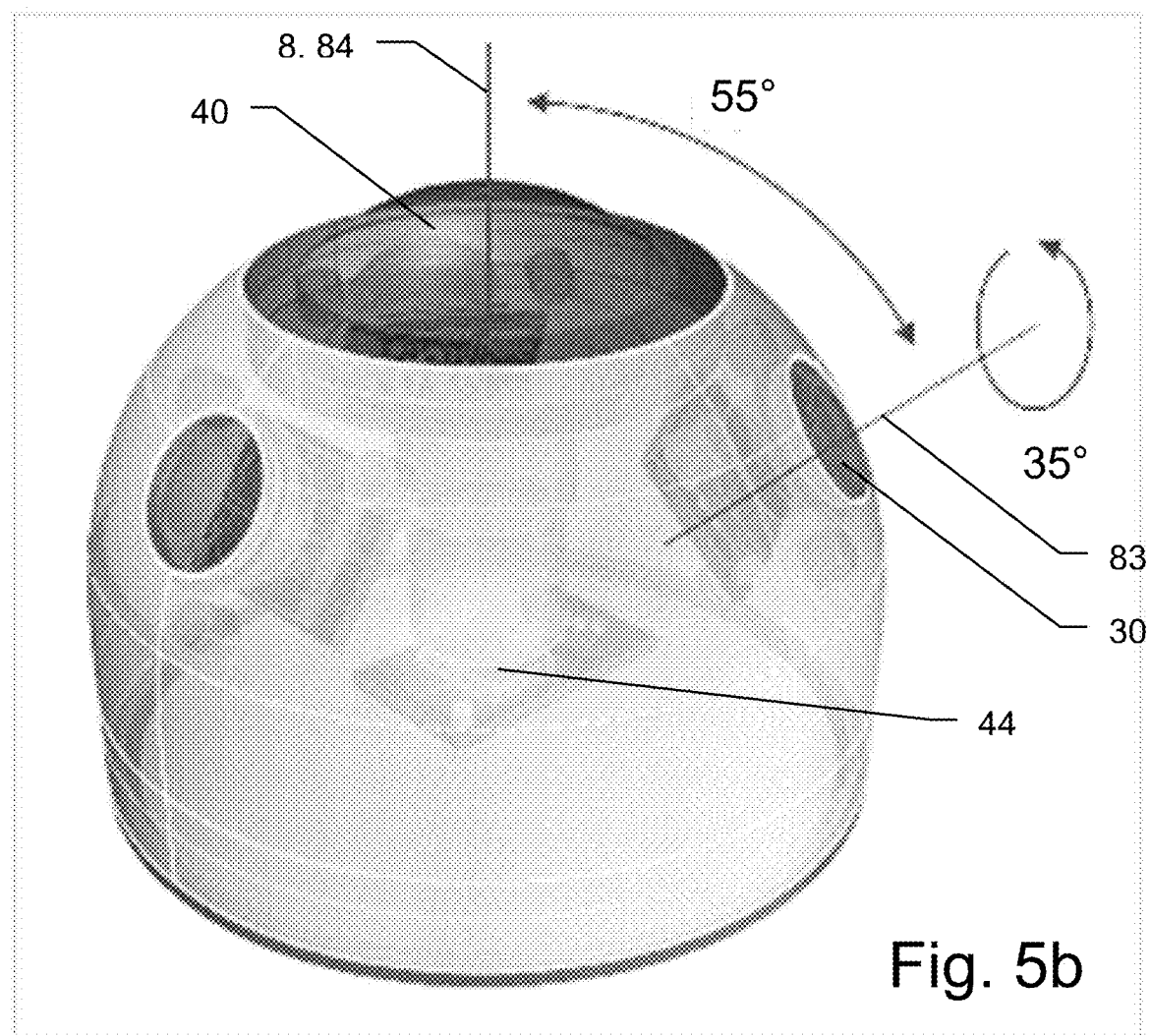
FIGS. 5c,d illustrate tilted sensor arrays associated with the sensor units of FIGS. 5a, b, respectively.
Figure 5C:
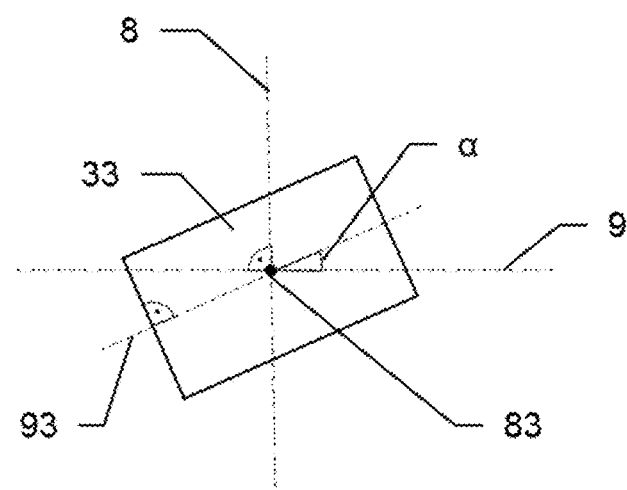

FIGS. 5a and 5c illustrate exemplary embodiments of the sensor unit 3 of FIG. 4a in greater detail.

FIG. 5a shows the fisheye lens 40 on top of the unit 30 being configured to allow the camera 44 to capture images with a field of view of 360°×190°.

In this embodiment, each of the three ToF cameras 30 is surrounded by three infrared laser emitters 35, wherein the ToF cameras are configured to receive reflections of light pulses emitted by the infrared laser emitters 35 and to measure distances to the reflecting surfaces using known time-of-flight principles.

These laser emitters 35 can be passive emitters that are connected to a central laser source of the device optionally amplified by e.g. an erbium-doped fiber amplifier, the passive emitters e.g. comprising fiber couplings, diffraction gratings or fiber-splittings. Alternatively, the laser emitters 35 can be active emitters, e.g. laser diodes or vertical-cavity surface-emitting laser (VCSEL) arrays that may be provided on the same printed circuit board as the respective ToF camera 30. Additionally, a lens can be placed in front of a VCSEL to collimate the emitted laser beam.

In the shown example, the infrared laser emitters 35 (together with the ToF cameras 30) are positioned in a section of the housing of the sensor unit 3 that is permeable to infrared light (IR permeable section 50). This allows hiding the sensitive laser sources inside the housing and emitting the light pulses through the IR permeable section 50 onto surfaces of the environment.

The range images captured by the ToF cameras may be used for ToF-based SLAM. In order to reduce noise in the range images and to enhance the accuracy and/or distance range of the SLAM, the some or all of the emitters 35 may be configured to project constant light patterns into the surrounding, so that only a subset of the pixels of the ToF sensor receives range information of the surrounding from the reflection of the light emitted by these emitters 35. The ToF-based SLAM optionally can be supported by visual SLAM using the 2D cameras.

In one embodiment, some or all of the emitters 35 are configured to project light patterns, e.g. by projecting light through a diffractive or refractive grating or a mesh, and other emitters 35 are configured to emit light without a pattern, so that the reflections illuminate the ToF sensor completely. If the emitters 35 emit the light sequentially, the patterned, incomplete but accurate, range images can be used to enhance the results of the complete but noisy range images.

Additionally or alternatively, the ToF cameras may be configured to capture intensity images. The intensity images comprise brightness information of the surrounding and can be used for performing visual SLAM based on these intensity images, while the device is moved through the surrounding. For producing intensity images, the emitters may emit diffused lighting instead of projected patterns. Since the emitters 35 emit infrared light, this visual SLAM is invisible to the user.

FIG. 5b illustrates an exemplary setup of the cameras relative to each other that allows a hemispherical field of view of the three ToF cameras 30. The optical axis 84 of the camera 44 capturing images through the fisheye lens 40 coincides with the first axis 8.

The number and size of gaps in the combined field of view of the sensor arrays of the ToF cameras 30 should be as small as possible. If the device is mobile and moved through a surrounding during the measurements, some gaps are acceptable. However, in a hemispherical field of view, the gaps still should not amount to more than 25%, preferably to less than 10%. Also, the sensor arrays should be arranged so that each sensor array receives reflections only of those light pulses that have been emitted by laser emitters of the same ToF camera 30 and not those of others. Consequently, the sensor arrays of the ToF cameras 30 should arranged with as few overlaps as possible.

To reduce, both, overlap and gaps, the three ToF cameras 30 are arranged around the housing of the sensor unit 3 equally distanced to each other, i.e. with an angle of 120° from each other. Also, the ToF cameras 30 are oriented so that their optical axes 83 are at an angle of about 55° to the first axis 8.

Preferably, each ToF camera has a rectangular sensor array to cover a rectangular field of view. The ToF cameras may be arranged vertically (i.e. with the longitudinal axis of the array being orthogonal to the first axis 8) or upright (i.e. rotated about the optical axis 83 of the respective camera by 90°).

To cover the top of the hemisphere with the ToF cameras' field of view with as few and small gaps as possible (or even without any gaps at all), the ToF cameras are preferably arranged so that the rectangular field of view of each of the ToF cameras 30 is rotated about the optical axis 83 of the respective camera by about 35°—i.e. so that the longitudinal axis of the array is rotated relative to a second axis that is orthogonal to the first axis 8 by about 35°. The exact amount for an optimal result may vary between 10° and 80° and i.a. depends on the width-to-height ratio of the rectangular array and on the number and exact position of each camera on the sensor unit 3.

Suitable ToF cameras 30 that can be used with such a setup, e.g., can have rectangular ToF sensor arrays with a resolution of 640×480 pixels, a pixel size of 5 μm and a 4.0 mm diagonal (e.g. 3.2×2.4 mm). An exemplary suitable RGB sensor for fisheye camera 44 may have a resolution of 5496×3694 pixels, a pixel size of 2.4 μm and a 15.86 mm diagonal (e.g. 13.19×8.86 mm).

FIG. 5c shows a sensor array 33 of a ToF camera arranged tilted to the second axis 9 mentioned above. The second axis 9 is orthogonal to the first axis 8. The emission axis 83 of the sensor array 33 points directly at the spectator. The sensor array 33 is rectangular with an aspect ratio of about 4:3. A longitudinal axis 93 that is parallel to two of the sides of the rectangular sensor array 33 is orthogonal to the emission axis 83 and tilted relative to the second axis 9 by angle α, e.g. by between 10° to 45°, for instance about 20° or about 35°.

Figure 5D:
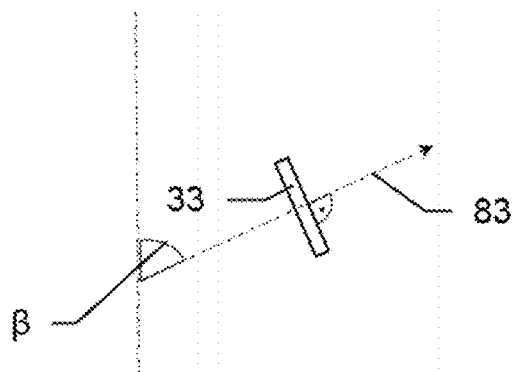

FIG. 5d shows a sensor array 33 of a ToF camera arranged tilted to the first axis 8 mentioned above. The emission axis 83 is orthogonal to the rectangular sensor array 33 and tilted relative to the first axis 8 by angle β, e.g. by more than 30°, in particular between 45° to 65°, for instance by about 55°.

Figure 6:
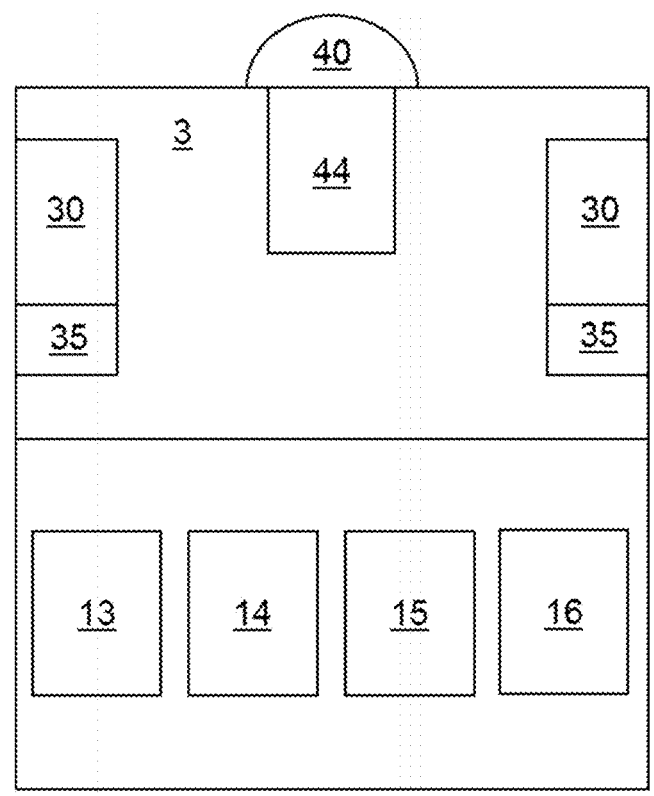
FIG. 6 shows internal components of an exemplary embodiment of a reality capture device.

FIG. 6 shows the interior components of an exemplary reality capture device according. A sensor unit 3 is mounted to a second portion, which could be embodied as the handle portion of a mobile reality capture device 1 as described with respect to FIG. 2a and 2b or as a base 20 of a fixedly mounted reality capture device 2 as described with respect to FIGS. 3a and 3b. The sensor unit 3 comprises a fisheye-camera setup with a camera 44 and an ultra-wide-angle "fisheye lens" for capturing image data with (at least) a hemispherical field of view. The sensor unit 3 also comprises a plurality of ToF cameras 30, each comprising a ToF sensor array and one or more laser emitters 35 (e.g. laser diodes). In the shown simplified example, there are two ToF cameras 30, however also three ToF cameras 30 or more than three can be used, in order to cover a field of view of 360°.

The second portion (i.e. the handle portion or base) comprises an energy provision unit 13 for providing electrical energy to the other components of the second portion and to the sensor unit 3. It may comprise a rechargeable battery or one or more receptacles for accepting one or more exchangeable batteries. Alternatively, or additionally, the energy provision unit 13 may comprise means for connection to an external power supply, e.g. a grid connection via a cable, plug and socket. If the device is a mobile reality capture device, a rechargeable battery may be charged by the external power supply or the device may be operated while being connected to the power grid by a cable.

Especially if the device is a mobile reality capture device, the second portion (e.g. the handle portion) may also comprise a localization unit 14 configured for continuously determining a position of the device, for instance for determining a trajectory of the mobile reality capture device during a measurement process. For instance, the localization unit 14 comprises an inertial measurement unit (IMU) and a GNSS receiver. The localization unit 14 may also comprise other sensors, such as a compass and a barometer, or be configured to deduce a position of the device from wireless communication signals such as WLAN. The localization unit 14 may also be configured to execute a simultaneous localization and mapping (SLAM) functionality using data of the sensor unit 3, i.e. image data generated by the camera 44. Optionally, also the 3D data generated by the ToF cameras 30 and/or data from the IMU may be used for improving the SLAM functionality.

The second portion also comprises a communication unit 15 for providing data generated in the sensor unit 3 to an external computer, e.g. a handheld device of the operator or to a server computer or a cloud. The communication unit 15 may be configured as a wireless communication unit, e.g. providing the data by means of WLAN, Bluetooth or mobile radio. Alternatively, the communication unit 15 may be configured as a tethered communication unit. In case of a fixedly mounted device, the data may then be provided by means of a LAN cable. If the device is mobile, the communication unit 15 may comprise a USB or similar receptacle for connecting a mobile device. The communication unit 15 may be configured to provide the data continuously, e.g. by streaming the data in real time. Alternatively, the data may be uploaded to the external device after a measurement process has been finished, e.g. when the external device is connected by means of cable or Bluetooth. The communication unit 15 may comprise a data storage for storing captured data until it is provided. If necessary, processing or post-processing of the uploaded or streamed data may be performed at the external computer or in the cloud. Alternatively or additionally, the device may comprise a processor 16 configured to process the data. The processor 16 may also be configured to pre-process the data, wherein the communication unit 15 is configured for uploading and/or streaming point the pre-processed data to allow post-processing of the pre-processed data at the computer or in the cloud.

Although the components 13-16 are depicted here as part of the second portion, of course some or all of these units may as well be integrated into the sensor unit 3.

Although various aspects are illustrated above, partly with reference to some preferred embodiments, it must be understood that numerous modifications and combinations of different features of the embodiments can be made. All of these modifications lie within the scope of the appended claims.

The invention claimed is:

1. A reality capture device configured to perform a measuring process for generating a digital representation of an environment, the device comprising:
    a body defining a first axis,
    an imaging unit with one or more 2D cameras configured to provide two-dimensional image data of the environment,
    a ToF camera arrangement configured for capturing three-dimensional point-cloud data of the environment and comprising at least two time-of-flight cameras, wherein:
        each time-of-flight camera comprises a sensor array and one or more laser emitters,
        the sensor array of each of the time-of-flight cameras has an optical axis and is configured to receive reflections of light pulses emitted by the one or more laser emitters of the respective time-of-flight camera, and
        the at least two time-of-flight cameras are arranged around the first axis so that each sensor array has one or two other sensor arrays as a neighbouring sensor array, wherein no angle about the first axis between the optical axes of a sensor array and one of its neighbouring sensor arrays is larger than $$\frac{360°}{n} + 20°,$$

where n is the number of time-of-flight cameras arranged around the first axis,
    wherein the device is a mobile reality capture device configured to be carried and moved by a mobile carrier, and to be moved during the measuring process, the mobile reality capture device comprising a localization unit configured for continuously determining a pose of the mobile reality capture device and for generating localization data, particularly wherein:
        the localization unit comprises an inertial measurement unit, and/or is configured for determining a trajectory of the mobile reality capture device;
        the mobile reality capture device is designed to be oriented during the measuring process so that the first axis is upright, and/or
        the mobile reality capture device comprises a handle portion and is configured to be carried by a person.

2. The reality capture device according to claim 1, the ToF camera arrangement comprising at least three time-of-flight cameras that are around the first axis so that each sensor array has two other sensor arrays as neighbouring sensor arrays, wherein no angle about the first axis between the optical axes of a sensor array and one of its neighbouring sensor arrays is larger than 140°.

3. The reality capture device according to claim 1, wherein:
    each sensor array has a resolution of at least 0.3 Megapixels, particularly wherein each sensor array has a resolution of at least 640×480 pixels;
    the sensor arrays are arranged and configured for jointly covering at least 75% of a hemispherical field of view, particularly at least 90%; and/or
    the laser emitters comprise laser diodes provided on a printed circuit board of the respective time-of-flight camera, and/or are configured to emit infrared light.

4. The reality capture device according to claim 1, wherein the time-of-flight cameras and the at least one 2D camera are integrated into the body, wherein the body has a housing with a lateral surface defining the first axis, wherein:
    the lateral surface is circumferentially arranged around the first axis, and/or
    the housing comprises an area that is permeable for infrared radiation, and the laser emitters are integrated into the housing and configured to emit infrared laser beams through the permeable area.

5. The reality capture device according to claim 1, configured for executing the measuring process while the device is moved along a path through the environment, in the course of which measuring process:
three-dimensional point-cloud data of the environment is captured continuously with the time-of-flight cameras,
two-dimensional image data of the environment is captured continuously by the one or more 2D cameras,
the localization unit is configured to continuously generate localization data while the device is moved along the path and to track a pose of the device based on the localization data, particularly in 6 degrees of freedom, and
the device is configured to link the captured point-cloud data and image data to the pose at which they are captured,
wherein the time-of-flight cameras and the one or more 2D cameras each are configured to capture and provide the three-dimensional point-cloud data and the two-dimensional image data with a rate of at least 5 operations per second, particularly at least 25 operations per second.

6. The reality capture device according to claim 5, wherein the localization unit is configured to execute:
a ToF-SLAM functionality using the three-dimensional point-cloud data for simultaneous localization and mapping, particularly also using two-dimensional image data of the imaging unit and/or localization data of the localization unit; and/or
a pose and trajectory determination functionality for continuously determining a pose and a trajectory of the device based on two-dimensional image data of the imaging unit and/or on three-dimensional point-cloud data.

7. The reality capture device according to claim 1, wherein the localization unit is configured to execute:
a ToF-SLAM functionality using the three-dimensional point-cloud data for simultaneous localization and mapping; and/or
a pose and trajectory determination functionality for continuously determining a pose and a trajectory of the device based on two-dimensional image data of the imaging unit and/or on three-dimensional point-cloud data.

8. The reality capture device according to claim 7, wherein:
at least a subset of the laser emitters is configured to emit light pulses in the form of a pattern to generate a pattern of reflections of the light pulses, and
the ToF camera arrangement is configured for capturing three-dimensional point-cloud data using the pattern of reflections,
the subset of the laser emitters comprises an optical lens, grating or mesh to produce the pattern, and/or
a localization unit of the device is configured to use the three-dimensional point-cloud data of the pattern of reflections to perform a ToF SLAM functionality for simultaneous localization and mapping.

9. The reality capture device according to claim 1, wherein:
at least a subset of the laser emitters is configured to emit light pulses in the form of a pattern to generate a pattern of reflections of the light pulses, and
the ToF camera arrangement is configured for capturing three-dimensional point-cloud data using the pattern of reflections,
the subset of the laser emitters comprises an optical lens, grating or mesh to produce the pattern, and/or
a localization unit of the device is configured to use the three-dimensional point-cloud data of the pattern of reflections to perform a ToF SLAM functionality for simultaneous localization and mapping.

10. The reality capture device according to claim 9, wherein:
the laser emitters are configured emit diffused infrared lighting,
the sensor array of each of the time-of-flight cameras is configured to receive reflections of the diffused infrared lighting emitted by the one or more laser emitters of the respective time-of-flight camera,
the time-of-flight cameras are configured to generate intensity images based on the received reflections of the diffused infrared lighting, and
the localization unit is configured to execute a Visual-SLAM and/or ToF-SLAM functionality using the intensity images received from the time-of-flight cameras for simultaneous localization and mapping.

11. The reality capture device according to claim 1, wherein:
the laser emitters are configured emit diffused infrared lighting,
the sensor array of each of the time-of-flight cameras is configured to receive reflections of the diffused infrared lighting emitted by the one or more laser emitters of the respective time-of-flight camera,
the time-of-flight cameras are configured to generate intensity images based on the received reflections of the diffused infrared lighting, and
the localization unit is configured to execute a Visual-SLAM and/or ToF-SLAM functionality using the intensity images received from the time-of-flight cameras for simultaneous localization and mapping.

12. The reality capture device according to claim 11, wherein the device comprises a handle portion, the device and the handle portion being designed so that the device can be held by a user during the measuring process, wherein:
the device and the handle portion are designed so that the first axis of the device is held tilted away from the user; and/or
the time-of-flight cameras are arranged around the first axis so that no light pulses are emitted by the one or more laser emitters into a direction of the user holding the device, the direction being defined by the position of the handle portion relative to the first axis.

13. The reality capture device according to claim 1, wherein the device comprises a handle portion, the device and the handle portion being designed so that the device can be held by a user during the measuring process, wherein:
the device and the handle portion are designed so that the first axis of the device is held tilted away from the user; and/or
the time-of-flight cameras are arranged around the first axis so that no light pulses are emitted by the one or more laser emitters into a direction of the user holding the device, the direction being defined by the position of the handle portion relative to the first axis.

14. The reality capture device according to claim 1, comprising:
a processor configured for processing or pre-processing point-cloud data and/or image data, and/or a communication unit configured for uploading and/or streaming point-cloud data and/or image data, to a computer or into a public or enterprise cloud, wherein the processor is configured for pre-processing point-cloud data and/or image data, and the wireless communication unit is configured for uploading and/or streaming the pre-processed point-cloud data and/or image data to allow post-processing of the pre-processed data at the computer or cloud.

15. A method for spatial mapping of an environment using the mobile reality capture device according to claim 14, the method comprising continuously capturing three-dimensional point-cloud data and two-dimensional image data of the environment while moving along a path through the environment, wherein:

the two-dimensional image data is captured by one or more 2D cameras that are arranged on the device and configured for jointly covering at least 75% of a hemispherical field of view;

the three-dimensional point-cloud data of the environment is captured simultaneously with a plurality of time-of-flight cameras, each time-of-flight camera comprising a sensor array and one or more laser emitters, the sensor arrays receiving reflections of light pulses emitted by the one or more laser emitters of the respective time-of-flight camera, the sensor arrays being arranged on the device and configured for jointly covering at least 75% of a hemispherical field of view; and localization data is generated continuously while moving along the path, a position is tracked based on the localization data, and the captured point-cloud data and image data are linked to the position at which they are captured.

16. A method for spatial mapping of an environment using the mobile reality capture device according to claim 1, the method comprising continuously capturing three-dimensional point-cloud data and two-dimensional image data of the environment while moving along a path through the environment, wherein:

the two-dimensional image data is captured by one or more 2D cameras that are arranged on the device and configured for jointly covering at least 75% of a hemispherical field of view;

the three-dimensional point-cloud data of the environment is captured simultaneously with a plurality of time-of-flight cameras, each time-of-flight camera comprising a sensor array and one or more laser emitters, the sensor arrays receiving reflections of light pulses emitted by the one or more laser emitters of the respective time-of-flight camera, the sensor arrays being arranged on the device and configured for jointly covering at least 75% of a hemispherical field of view; and localization data is generated continuously while moving along the path, a position is tracked based on the localization data, and the captured point-cloud data and image data are linked to the position at which they are captured.

17. A reality capture device configured to perform a measuring process for generating a digital representation of an environment, the device comprising:

a body defining a first axis, an imaging unit with one or more 2D cameras configured to provide two-dimensional image data of the environment, a ToF camera arrangement configured for capturing three-dimensional point-cloud data of the environment and comprising at least two time-of-flight cameras, wherein:

each time-of-flight camera comprises a sensor array and one or more laser emitters, the sensor array of each of the time-of-flight cameras has an optical axis and is configured to receive reflections of light pulses emitted by the one or more laser emitters of the respective time-of-flight camera, and the at least two time-of-flight cameras are arranged around the first axis so that each sensor array has one or two other sensor arrays as a neighbouring sensor array, wherein no angle about the first axis between the optical axes of a sensor array and one of its neighbouring sensor arrays is larger than $$\frac{360°}{n} + 20°,$$

where n is the number or time-of-flight cameras arranged around the first axis, wherein:

each of the time-of-flight cameras has a rectangular sensor array with a longitudinal axis that is parallel to two sides of the sensor array and orthogonal to the respective optical axis, wherein each sensor array is arranged so that its longitudinal axis is tilted relative to a second axis that is orthogonal to the first axis so that an angle ($\alpha$) between the longitudinal axis and the second axis is between 10° to 45°, and/or the sensor arrays are arranged tilted relative to the first axis, so that an angle ($\beta$) between the first axis and the optical axis of each time-of-flight camera is between 45° and 65°, wherein each sensor array has an aspect ratio of 4:3.

18. A reality capture device configured to perform a measuring process for generating a digital representation of an environment, the device comprising:

a body defining a first axis, an imaging unit with one or more 2D cameras configured to provide two-dimensional image data of the environment, a ToF camera arrangement configured for capturing three-dimensional point-cloud data of the environment and comprising at least two time-of-flight cameras, wherein:

each time-of-flight camera comprises a sensor array and one or more laser emitters, the sensor array of each of the time-of-flight cameras has an optical axis and is configured to receive reflections of light pulses emitted by the one or more laser emitters of the respective time-of-flight camera, and the at least two time-of-flight cameras are arranged around the first axis so that each sensor array has one or two other sensor arrays as a neighbouring sensor array, wherein no angle about the first axis between the optical axes of a sensor array and one of its neighbouring sensor arrays is larger than $$\frac{360°}{n} + 20°,$$

where n is the number of time-of-flight cameras arranged around the first axis, wherein two or more 2D cameras, are arranged around the first axis, wherein:
- the 2D cameras are arranged and configured for jointly covering at least a visual field of view covered by the sensor arrays;
- the 2D cameras are arranged and configured for jointly covering at least 75% of a hemispherical visual field, particularly at least 90%; and/or
- at least a subset of the 2D cameras are ultra-high-definition cameras.

19. A reality capture device configured to perform a measuring process for generating a digital representation of an environment, the device comprising:
- a body defining a first axis,
- an imaging unit with one or more 2D cameras configured to provide two-dimensional image data of the environment,
- a ToF camera arrangement configured for capturing three-dimensional point-cloud data of the environment and comprising at least two time-of-flight cameras, wherein:
  - each time-of-flight camera comprises a sensor array and one or more laser emitters,
  - the sensor array of each of the time-of-flight cameras has an optical axis and is configured to receive reflections of light pulses emitted by the one or more laser emitters of the respective time-of-flight camera, and
  - the at least two time-of-flight cameras are arranged around the first axis so that each sensor array has one or two other sensor arrays as a neighbouring sensor array, wherein no angle about the first axis between the optical axes of a sensor array and one of its neighbouring sensor arrays is larger than $$\frac{360°}{n} + 20°,$$

where n is the number of time-of-flight cameras arranged around the first axis, wherein the imaging unit comprises a fisheye-camera arrangement with a high-resolution 2D camera and a fisheye lens, the camera and the fisheye lens of the fisheye-camera arrangement being arranged and configured to capture image data covering a visual field of 360° around the first axis and at least 160° around a second axis that is orthogonal to the first axis, wherein:
- the high-resolution 2D camera and the fisheye lens of the fisheye-camera arrangement are arranged and configured to capture image data covering a visual field of 360° around the first axis and at least 190° around the second axis,
- the high-resolution 2D camera has a first optical axis that is parallel to the first axis or coincides with the first axis, and/or
- the high-resolution 2D camera is an ultra-high-definition camera, particularly configured to provide images with at least 20 Megapixels.

* * * * *